United States Patent
Mondal et al.

(10) Patent No.: US 10,193,380 B2
(45) Date of Patent: Jan. 29, 2019

(54) POWER SOURCES AND SYSTEMS UTILIZING A COMMON ULTRA-CAPACITOR AND BATTERY HYBRID ENERGY STORAGE SYSTEM FOR BOTH UNINTERRUPTIBLE POWER SUPPLY AND GENERATOR START-UP FUNCTIONS

(71) Applicant: Inertech IP LLC, Danbury, CT (US)

(72) Inventors: Subrata K. Mondal, South Windsor, CT (US); Jakob Carnemark, Fairfield, CT (US)

(73) Assignee: Inertech IP LLC, Danbury, CT (US)

( * ) Notice: Subject to any disclaimer, the term of this patent is extended or adjusted under 35 U.S.C. 154(b) by 353 days.

(21) Appl. No.: 14/994,850

(22) Filed: Jan. 13, 2016

(65) Prior Publication Data
US 2016/0204654 A1    Jul. 14, 2016

Related U.S. Application Data

(60) Provisional application No. 62/102,850, filed on Jan. 13, 2015.

(51) Int. Cl.
*H02J 7/00* (2006.01)
*H02J 9/00* (2006.01)
*H02J 9/06* (2006.01)

(52) U.S. Cl.
CPC .............. *H02J 9/066* (2013.01); *H02J 7/007* (2013.01); *H02J 7/0068* (2013.01)

(58) Field of Classification Search
CPC ........... H02J 9/066; H02J 7/007; H02J 7/0068
(Continued)

(56) References Cited

U.S. PATENT DOCUMENTS 5,715,693 A    2/1998   van der Walt et al.
5,818,379 A    10/1998  Kim
(Continued)

FOREIGN PATENT DOCUMENTS

AU    2010256688 A1    1/2012
CN    101442893 A      5/2009
(Continued)

OTHER PUBLICATIONS

HP Modular Cooling System Site Preparation Guide, 2006-2007, <http://h20565.www2.hp.com/hpsc/doc/public/display?docId=emr_na-c00613691>.
(Continued)

*Primary Examiner* — Richard Tan
(74) *Attorney, Agent, or Firm* — Weber Rosselli & Cannon LLP

(57) ABSTRACT

Modular dual power sources and corresponding systems include a common hybrid energy storage system, a high frequency DC-DC converter coupled between the common hybrid energy storage system, and an ultra-capacitor module for starting up a generator, and a two-level inverter coupled to the common hybrid energy storage system to provide power in case of an interruption in power supplied by a utility supply. The hybrid energy storage system includes an ultra-capacitor module and a battery module. A fast charger is coupled to the hybrid energy storage system to quickly charge the ultra-capacitor module and the battery module, which, in turn, charge the ultra-capacitor module for starting up a generator via a high frequency DC-DC converter. High frequency transformers are used to magnetically isolate electrical noise of the generator and UPS functions and operate independently. The modular dual power sources can be connected in parallel to provide large MW output power.

20 Claims, 15 Drawing Sheets

(58) Field of Classification Search
USPC .......................................................... 307/67
See application file for complete search history.

(56) References Cited

U.S. PATENT DOCUMENTS

| | | | |
|---|---|---|---|
| 6,116,048 A | 9/2000 | Hebert |
| 6,374,627 B1 | 4/2002 | Schumacher et al. |
| 6,574,104 B2 | 6/2003 | Patel et al. |
| 6,640,561 B2 | 11/2003 | Roberto |
| 6,772,604 B2 | 8/2004 | Bash et al. |
| 6,826,922 B2 | 12/2004 | Patel et al. |
| 6,859,366 B2 | 2/2005 | Fink |
| 6,980,433 B2 | 12/2005 | Fink |
| 7,046,514 B2 | 5/2006 | Fink et al. |
| 7,106,590 B2 | 9/2006 | Chu et al. |
| 7,173,820 B2 | 2/2007 | Fink et al. |
| 7,406,839 B2 | 8/2008 | Bean et al. |
| 7,418,825 B1 | 9/2008 | Bean, Jr. |
| 7,477,514 B2 | 1/2009 | Campbell et al. |
| 7,569,954 B2 | 8/2009 | Tolle et al. |
| 7,660,116 B2 | 2/2010 | Claassen et al. |
| 7,660,121 B2 | 2/2010 | Campbell et al. |
| 7,684,193 B2 | 3/2010 | Fink et al. |
| 7,730,731 B1 | 6/2010 | Bash et al. |
| 7,738,251 B2 | 6/2010 | Clidaras et al. |
| 7,804,687 B2 | 9/2010 | Copeland et al. |
| 7,855,890 B2 | 12/2010 | Kashirajima et al. |
| 7,864,527 B1 | 1/2011 | Whitted |
| 7,881,057 B2 | 2/2011 | Fink et al. |
| 7,903,404 B2 | 3/2011 | Tozer et al. |
| 7,903,409 B2 | 3/2011 | Patel et al. |
| 7,907,406 B1 | 3/2011 | Campbell et al. |
| 7,957,144 B2 | 6/2011 | Goettert et al. |
| 7,963,119 B2 | 6/2011 | Campbell et al. |
| 8,000,103 B2 | 8/2011 | Lipp et al. |
| 8,031,468 B2 | 10/2011 | Bean, Jr. et al. |
| 8,118,084 B2 | 2/2012 | Harvey |
| 8,120,916 B2 | 2/2012 | Schmidt et al. |
| 8,146,374 B1 | 4/2012 | Zien |
| 8,184,435 B2 | 5/2012 | Bean, Jr. et al. |
| 8,189,334 B2 | 5/2012 | Campbell et al. |
| 8,199,504 B2 | 6/2012 | Kashirajima et al. |
| 8,208,258 B2 | 6/2012 | Campbell et al. |
| 8,218,322 B2 | 7/2012 | Clidaras et al. |
| 8,261,565 B2 | 9/2012 | Borror et al. |
| 8,289,710 B2 | 10/2012 | Spearing et al. |
| 8,297,069 B2 | 10/2012 | Novotny et al. |
| 8,320,125 B1 | 11/2012 | Hamburgen et al. |
| 8,351,200 B2 | 1/2013 | Arimilli et al. |
| 8,387,687 B2 | 3/2013 | Baer |
| 8,392,035 B2 | 3/2013 | Patel et al. |
| 8,405,977 B2 | 3/2013 | Lin |
| 8,432,690 B2 | 4/2013 | Fink et al. |
| 8,456,840 B1 | 6/2013 | Clidaras et al. |
| 8,457,938 B2 | 6/2013 | Archibald et al. |
| 8,472,182 B2 | 6/2013 | Campbell et al. |
| 8,514,575 B2 | 8/2013 | Goth et al. |
| 8,583,290 B2 | 11/2013 | Campbell et al. |
| 8,689,861 B2 | 4/2014 | Campbell et al. |
| 8,760,863 B2 | 6/2014 | Campbell et al. |
| 8,763,414 B2 | 7/2014 | Carlson et al. |
| 8,780,555 B2 | 7/2014 | Fink et al. |
| 8,783,052 B2 | 7/2014 | Campbell et al. |
| 8,797,740 B2 | 8/2014 | Campbell et al. |
| 8,813,515 B2 | 8/2014 | Campbell et al. |
| 8,817,465 B2 | 8/2014 | Campbell et al. |
| 8,817,474 B2 | 8/2014 | Campbell et al. |
| 8,824,143 B2 | 9/2014 | Campbell et al. |
| 8,839,638 B2 | 9/2014 | Kashirajima et al. |
| 8,867,204 B1 | 10/2014 | Gardner |
| 8,879,257 B2 | 11/2014 | Campbell et al. |
| 2002/0172007 A1 | 11/2002 | Pautsch |
| 2003/0061824 A1 | 4/2003 | Marsala |
| 2004/0184232 A1 | 9/2004 | Fink |
| 2006/0245216 A1 | 11/2006 | Wu et al. |
| 2007/0227710 A1 | 10/2007 | Belady et al. |
| 2009/0086428 A1 | 4/2009 | Campbell et al. |
| 2009/0154096 A1 | 6/2009 | Iyengar et al. |
| 2010/0032142 A1 | 2/2010 | Copeland et al. |
| 2010/0136895 A1 | 6/2010 | Sgro |
| 2010/0300650 A1 | 12/2010 | Bean, Jr. |
| 2011/0198057 A1 | 8/2011 | Lange et al. |
| 2011/0265983 A1 | 11/2011 | Pedersen |
| 2011/0313576 A1 | 12/2011 | Nicewonger |
| 2012/0103591 A1 | 5/2012 | Tozer |
| 2012/0174612 A1 | 7/2012 | Madara et al. |
| 2014/0009988 A1 | 1/2014 | Valiani |
| 2015/0155712 A1 | 6/2015 | Mondal |

FOREIGN PATENT DOCUMENTS

| | | |
|---|---|---|
| CN | 100584168 C | 1/2010 |
| CN | 101686629 C | 3/2010 |
| CN | 102334396 A | 1/2012 |
| CN | 102461357 A | 5/2012 |
| DE | 102012218873 A1 | 5/2013 |
| EP | 1604263 A2 | 12/2005 |
| EP | 2722978 A2 | 4/2014 |
| JP | 2008287733 A | 11/2008 |
| JP | 5113203 B2 | 1/2013 |
| JP | 5209584 B2 | 6/2013 |
| JP | 5243929 B2 | 7/2013 |
| JP | 5244058 B2 | 7/2013 |
| JP | 5301009 B2 | 9/2013 |
| JP | 5308750 B2 | 10/2013 |

OTHER PUBLICATIONS

Air-Cooled High-Performance Data Centers: Case Studies and Best Methods, 2006, <http://www.intel.in/content/dam/www/public/us/en/documents/white-papers/date-center-efficiency-air-cooled-bkms-paper.pdf>.

Liebert Xtreme Density—System Design Manual, 2009, <http://shared.liebert.com/SharedDocuments/LiebertFiles/SL_16655_REV09_07-09_pdf>.

Data Center Evolution A Tutorial on State of the Art, Issues, and Challenges, 2009, <http://www.cse.iitb.ac.in/~puru/courses/autumn12/cs695/downloads/dcevolve.pdf>.

Weatherman: Automated, Online, and Predictive Thermal Mapping and Management for Data Centers, 2006, <http://www.cse.iitb.ac.in/~puru/courses/spring14/cs695/downloads/weatherman.pdf>.

Reduced-Order Modeling of Multiscale Turbulent Convection: Application to Data Center Thermal Management, May, 2006, <https://smartech.gatech.edu/bitstream/handle/1853/14605/rambo_jeffrey_200605_phd.pdf>.

PCT International Search Report and Written Opinion for PCT/US2015/056785 dated Feb. 2, 2016.

POWER SOURCES AND SYSTEMS UTILIZING A COMMON ULTRA-CAPACITOR AND BATTERY HYBRID ENERGY STORAGE SYSTEM FOR BOTH UNINTERRUPTIBLE POWER SUPPLY AND GENERATOR START-UP FUNCTIONS

BACKGROUND

Technical Field

The present disclosure relates to uninterruptible power supplies (UPS) and generators.

Background of Related Prior Art

There is large demand for data centers to store data due to the emergence of Web-2.0 enabled businesses in the financial, e-commerce, pharmaceutical, and multi-media industries. The digital storage market doubles every 18 months, which translates into an annual growth rate of approximately 150%. Computer equipment manufacturers continue to expand their data collection and storage capabilities of their servers, which are widely used in data centers across the world. This expansion has led to an increase in the total power requirements of data centers both while connected to an electrical utility and during an interruption in power from the electrical utility. In particular, data centers now demand power in the megawatt range and voltage in the medium voltage kilovolt range. As a result, data centers require UPSs that can meet these high power and high/medium voltage requirements when there is a short interruption in the power supplied from the electrical utility. In case of long interruption of power, generators take over the function of supplying power.

SUMMARY

The present disclosure relates to generator and UPS functions incorporated into a modular design. A common hybrid energy storage system utilizes at least one ultra-capacitor (UC) module and at least one battery module to provide the following two functions: start up a generator by delivering required cranking current using a high frequency DC-DC converter, such as an isolated high frequency MOSFET-based DC-DC converter, and deliver UPS power using a two-level inverter, such as an insulated-gate bipolar transistor (IGBT)-based two-level Space Vector Pulse Width Modulation (SVPWM) DC-AC inverter. Charging of the common energy storage system is achieved by a fast charger, such as an IGBT-based AC-DC-DC fast charger. The fast charger ensures that the at least one UC module and the at least one battery module are always ready to be used in case of an interruption in power from the utility supply. The fast charger also provides a stable DC voltage for charging the at least one UC module and the at least one battery module.

In one aspect, the present disclosure features a modular dual power source. The power source includes: a first ultra-capacitor module; a battery module connected in parallel with the first ultra-capacitor module; a two-level inverter connected to the first ultra-capacitor module and the battery module; a high frequency DC-DC converter connected to the first ultra-capacitor module and the battery module; a fast charger connected to the first ultra-capacitor module and the battery module, and operable to charge the first ultra-capacitor module and the battery module; and a second ultra-capacitor module connected to the output of the high frequency DC-DC converter and configured for starting up a generator. Other embodiments of this aspect include corresponding computer systems, apparatus, and computer programs recorded on one or more computer storage devices, each configured to perform the actions of the methods.

Implementations of the power source may include one or more of the following features. The power source may include a low-voltage generator connected to the second ultra-capacitor. The fast charger may be an AC-DC-DC fast charger and may be connected in parallel with the first ultra-capacitor module and the battery module. The AC-DC-DC fast charger may include an AC-DC converter, a capacitor module connected to the AC-DC converter, and a DC-DC fast charger converter connected to the capacitor module. The AC-DC converter may include three pairs of series-connected power switching devices for providing 3-phase output power.

The power switching devices may be insulated-gate bipolar transistors (IGBTs), gate turn-off thyristors (GTOs), or metal-oxide-semiconductor field-effect transistor (MOSFET) devices. The power source may include an LC filter connected to the AC-DC converter to smooth out harmonics to provide stable DC power. The DC-DC charger converter may be a DC-DC boost converter. The fast charger may be a bidirectional fast charger. The high frequency DC-DC converter may include: a first H-bridge circuit; multiple transformers having primary sides and secondary sides, the primary sides connected in series to the first H-bridge circuit; multiple second H-bridge circuits connected to respective secondary sides of the multiple transformers; and multiple LC filters connected to respective second H-bridge circuits of the multiple second H-bridge circuits.

In some embodiments, the first H-bridge circuit may include multiple MOSFET devices connected in an H-bridge configuration and each of the second H-bridge circuits may include multiple MOSFET devices connected in an H bridge configuration. In other embodiments, the first H-bridge circuit may include multiple MOSFET devices connected in an H-bridge configuration and each of the second H-bridge circuits may include multiple diodes connected in an H-bridge configuration. The transformers may be high frequency planar transformers.

In another aspect, the present disclosure features a backup power system including: a hybrid energy storage system; an uninterruptible power supply including an inverter and connected to the hybrid energy storage system; a high frequency DC-DC converter connected to the hybrid energy storage system; an ultra-capacitor module connected to the high frequency DC-DC converter; a low-voltage generator connected to the ultra-capacitor module; a two-level inverter connected to the hybrid energy storage system; and a fast charger connected to the hybrid energy storage system and configured to charge the hybrid energy storage system.

The hybrid energy storage system may include a second ultra-capacitor module and a battery module connected together. In some embodiments, the backup power system may include: a step-up transformer connected to an output of the low-voltage generator; and a step-up transformer connected to an output of the uninterruptible power supply. In other embodiments, the backup power system does not include a step-up transformer between either an output of the low-voltage generator or an output of the uninterruptible power supply and an IT and/or cooling system load.

In yet another aspect, the present disclosure features a backup power source control system. The backup power source control system includes: a hybrid energy management system that obtains information regarding a hybrid energy storage system including a first ultra-capacitor module and a battery module; a fast charger controller that controls a fast charger to charge the hybrid energy storage system based on the information regarding the hybrid energy storage system obtained by the hybrid energy management system; an inverter controller that controls an inverter to discharge energy from the hybrid energy storage system if an interruption in or failure of a utility power supply is detected; an ultra-capacitor energy management system that obtains information regarding a second ultra-capacitor module for starting up a generator; and a high frequency DC-DC converter controller that controls a high frequency DC-DC converter to charge the second ultra-capacitor module using energy from the hybrid energy storage system based on the information regarding the second ultra-capacitor module obtained by the ultra-capacitor energy management system.

Implementations of the backup power source control system may include one or more of the following features. The backup power source control system may include a building management system controller configured to detect whether there is an interruption in or failure of the utility power supply and send a command signal to the inverter controller to control the inverter to discharge energy from the hybrid energy storage system if the building management system controller detects an interruption in or failure of the utility power supply. The information regarding the hybrid energy storage system or the information regarding the second ultra-capacitor module may include current, voltage, and temperature.

DETAILED DESCRIPTION

Figure 1:
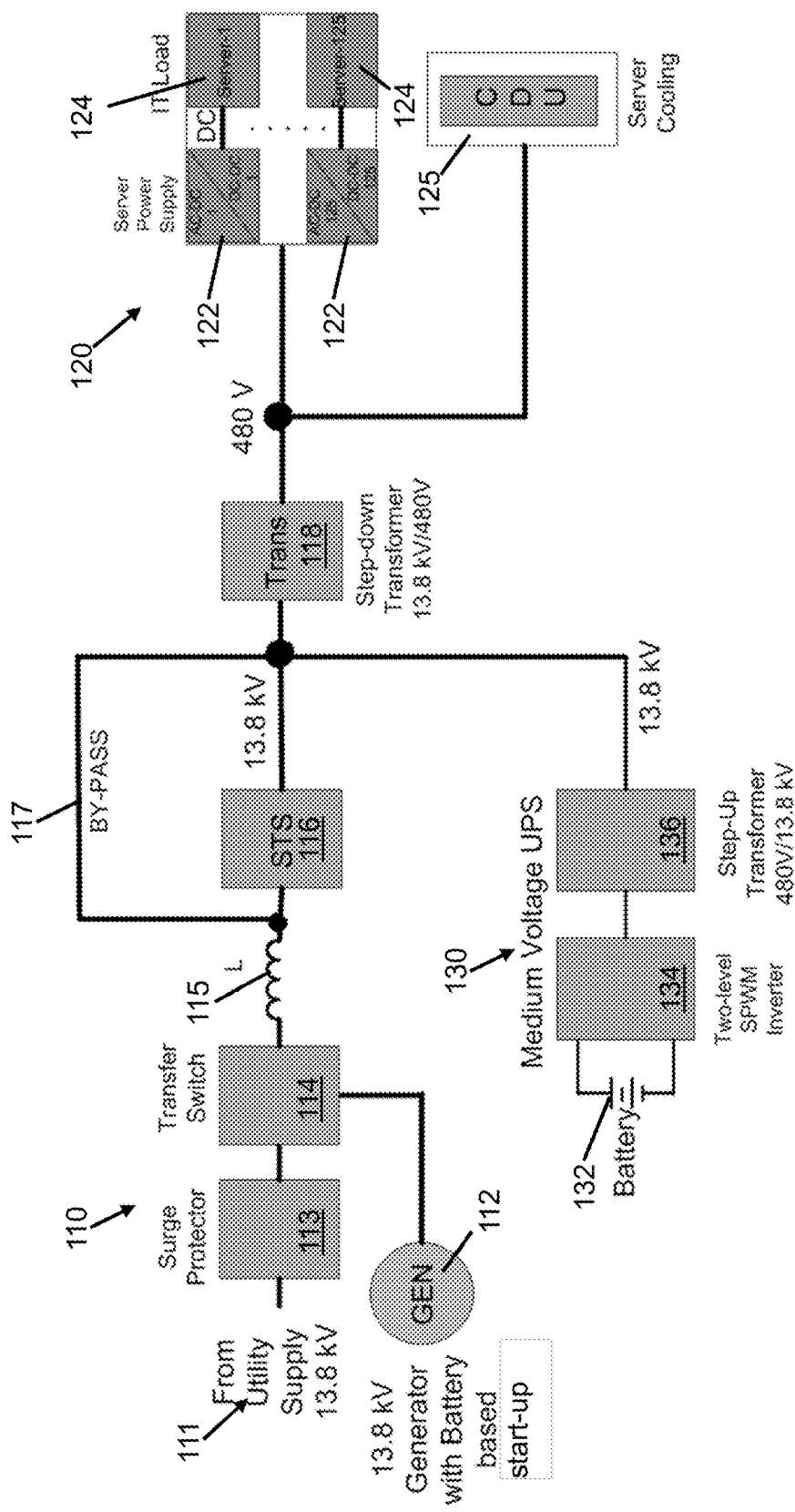
FIG. 1 is a circuit block diagram of a medium voltage (MV) data center system with an independent MV generator with battery-based start-up and independent MV uninterruptible power supply (UPS) with battery-based energy storage including a step-up output transformer.

FIG. 1 is a circuit block diagram of a medium voltage (MV) data center system with independent MV generator with battery-based start-up and independent MV uninterruptible power supply (UPS) with battery-based energy storage including a step-up output transformer. According to this system, power is supplied to an information technology (IT) load, e.g., servers 124, and/or a mechanical load, e.g., a cooling distribution unit 125. The data center system includes a utility/generator power supply system and an uninterruptible power supply (UPS) 130 that includes a step-up transformer 136 for medium voltage applications. For example, the step-up transformer 136 may step up the voltage from 480 V to 13.8 kV.

Under normal load conditions, power is supplied to the IT load and/or the mechanical load entirely by the utility supply 111. The utility supply 111 may supply an AC voltage ranging from about 3.3 kV to about 13.8 kV. The mechanical portion of the load includes electrical power required to operate cooling equipment, such as the CDU 125, which remove waste heat generated by the IT portion of the load.

A surge protector 113 receives power from the utility supply 111 and is used to limit voltage spikes in the power supplied by the utility supply 111. A bypass line 117 allows maintenance tasks or other work to be performed on the data center system when an ON/OFF switch (not shown) on the bypass line is closed and a static transfer switch (STS) 116 is opened. Line filter (L) 115 is coupled to the AC line to reduce harmonics in the power supplied by the utility supply 111 or the generator 112. The STS 116 supplies power to a step-down transformer 118 when the STS 116 is closed and the bypass line 117 is open. The step-down transformer can convert the medium voltage supplied by the utility supply, e.g., 13.8 kV, to a low voltage, e.g., 480 V. The low voltage is then supplied to the IT load, e.g., server power supplies 122 connected to respective servers 124, having an appropriate current and voltage level. The server power supplies 122 may include an AC-DC converter and a DC-DC converter.

When an interruption or disturbance in the power supplied by the utility supply 111 is detected, the STS 116 opens and the UPS system 130, which includes the battery 132, a two-level inverter, and the step-up transformer 136, starts supplying about 100% of the power to the load 120 via the step-down transformer 118. The UPS system 130 can supply power to the load 120 for a short period, e.g., approximately two to five minutes depending on the Amp-hour storage capacity of the battery 132. Generally, the generator 112 starts generating power if the interruption is more than a few seconds.

The UPS system 130 generates power from a low-voltage energy storage device, e.g., one or more lead-acid or Li-ion batteries 132 connected in series and parallel mode. The low voltage of the energy storage device can range from about 700 V to about 1000 V. The battery voltage is then converted to a low AC voltage, e.g., 480 V, using the two-level inverter 134.

The AC voltage output from the two-level inverter 134 may pass through a filter (not shown), such as an inductor-capacitor (LC) filter, to a step-up transformer 136. The step-up transformer 136 converts the low AC voltage to a medium AC voltage, e.g., 13.8 kV. The medium AC voltage output from the step-up transformer 136 is then provided to the step-down transformer 118, which converts the medium AC voltage, e.g., 13.8 kV, to a low AC voltage, e.g., 480 V, appropriate for the load 120.

Once the generator 112 has reached its reference speed and stabilized, transfer switch 116 shifts the primary power source from the utility supply 111 to the generator 112. During this shift, the output voltage of the UPS system 130 is synchronized to be in phase with the output voltage of the generator 112. Once STS 116 is closed, a soft transfer from the UPS system 130 to the generator 112 is executed until the load 120 is entirely powered by the generator 112. The energy storage device 132 of the UPS system 130 is then recharged by the power generated by the generator 112.

After the power interruption or disturbance ends, the load 120 is shifted from the generator 112 to the UPS system 130 because the utility supply 111 may be out of phase with the generator 112 and the STS 116 shifts the primary power source to the utility supply 111. The output voltage of the UPS system 130 is then synchronized to be in phase with the output voltage of the utility supply 111. Once the output voltage of the UPS system 130 and utility supply 111 are synchronized, the load 120 is quickly transferred from the UPS system 130 to the utility supply 111. Then, the energy storage device 132 of the UPS system 130 is recharged from the utility supply 111 so that the UPS system 130 is ready for future interruptions or disturbances in the utility supply 111.

Figure 2:
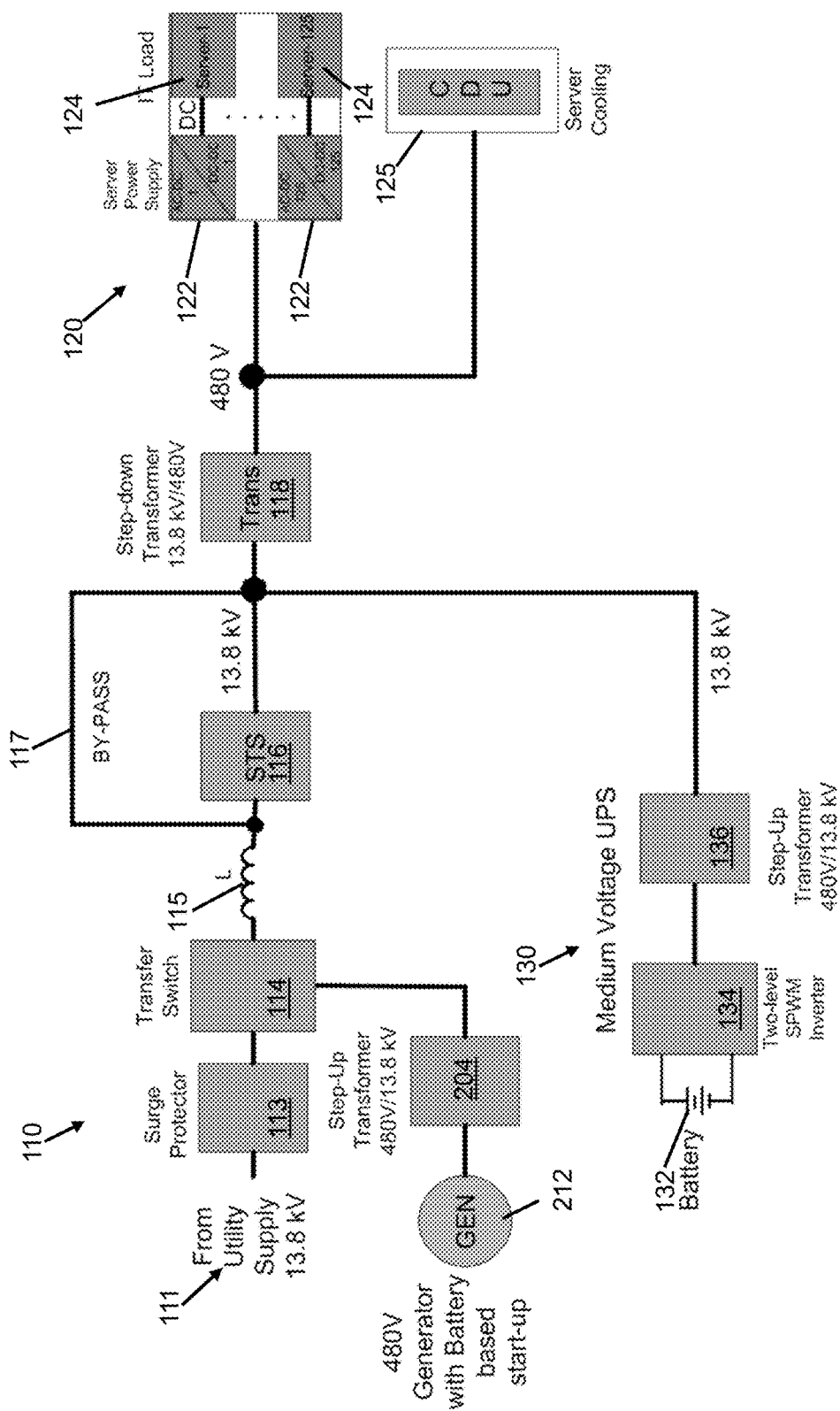
FIG. 2 is a circuit block diagram of an MV data center topology with a separate low-voltage (LV) generator with battery-based start-up including step-up output transformer and separate MV UPS including step-up output transformer with battery storage.

FIG. 2 is a circuit block diagram of an MV data center system with a separate low-voltage (LV) generator 212 with battery-based start-up including step-up output transformer 204 and a separate MV UPS 130 including step-up output transformer 136 and battery storage 132. The output voltage of the generator 212 is low, e.g., 480 V. Therefore, step-up transformer 204 is needed at the output of the generator 212 to operate at medium voltage, e.g., 13.8 kV, distribution. Also, MV UPS operation is achieved by adding step-up transformer 136 at the output of the low-voltage inverter system 134.

Figure 3:
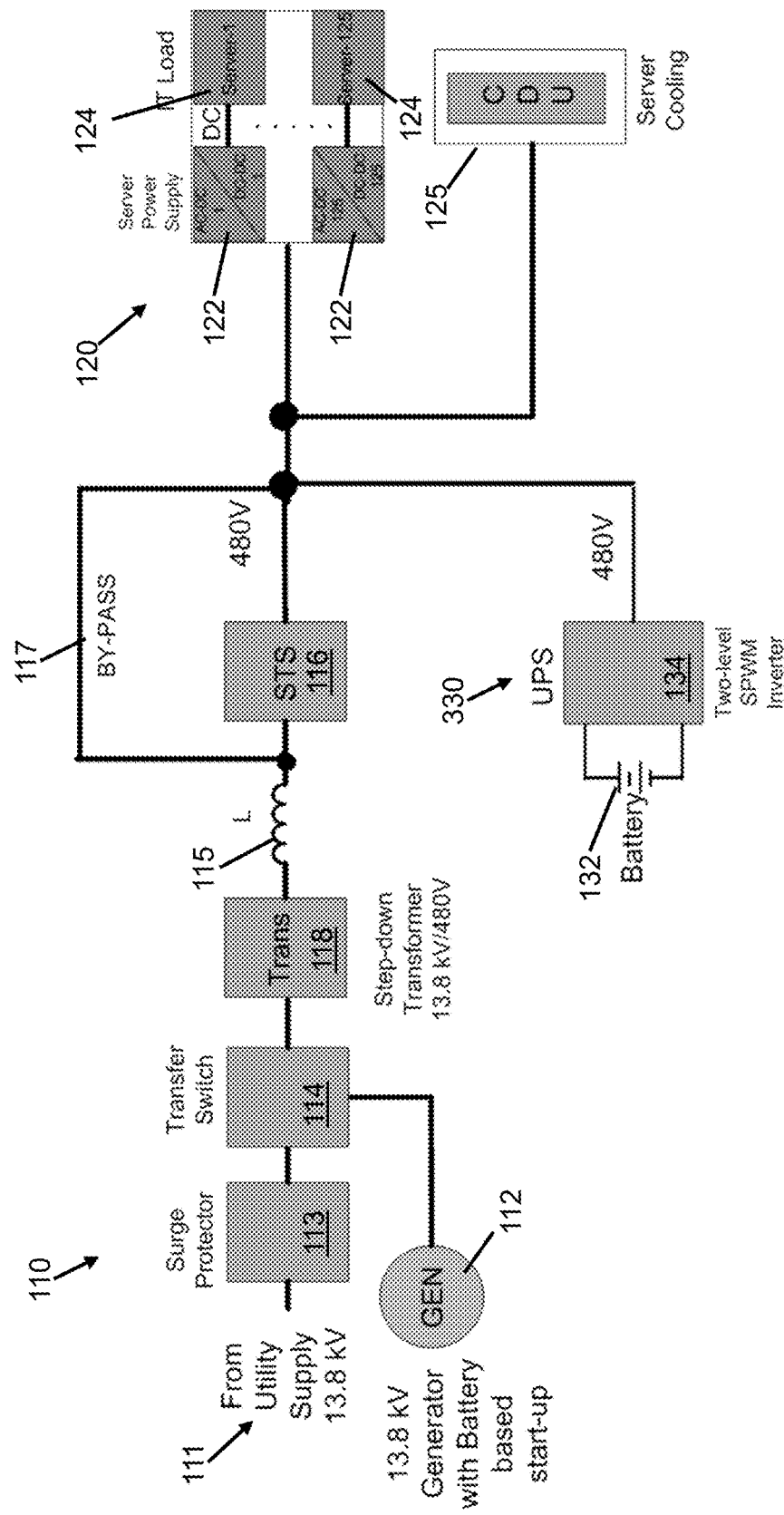
FIG. 3 is a circuit block diagram of a hybrid data center system with an independent MV generator with battery-based start-up and an independent LV UPS with battery-based energy storage connected at an LV level.

FIG. 3 is a circuit block diagram of a hybrid data center system with an independent MV generator 112 with battery-based start-up and an independent LV UPS 330 with battery-based energy storage device connected at an LV level. As shown in FIG. 3, the step-down transformer 118 is placed between the transfer switch 114 and the filter inductor 115. The output voltage of the UPS 330 is low, e.g. 480 V, and is connected at the low-voltage end of the utility supply system 110. The step-down transformer 118 is placed before the line inductor 115 to operate the UPS 330 and the related systems at low voltage, e.g. 480 V, distribution.

Figure 4:
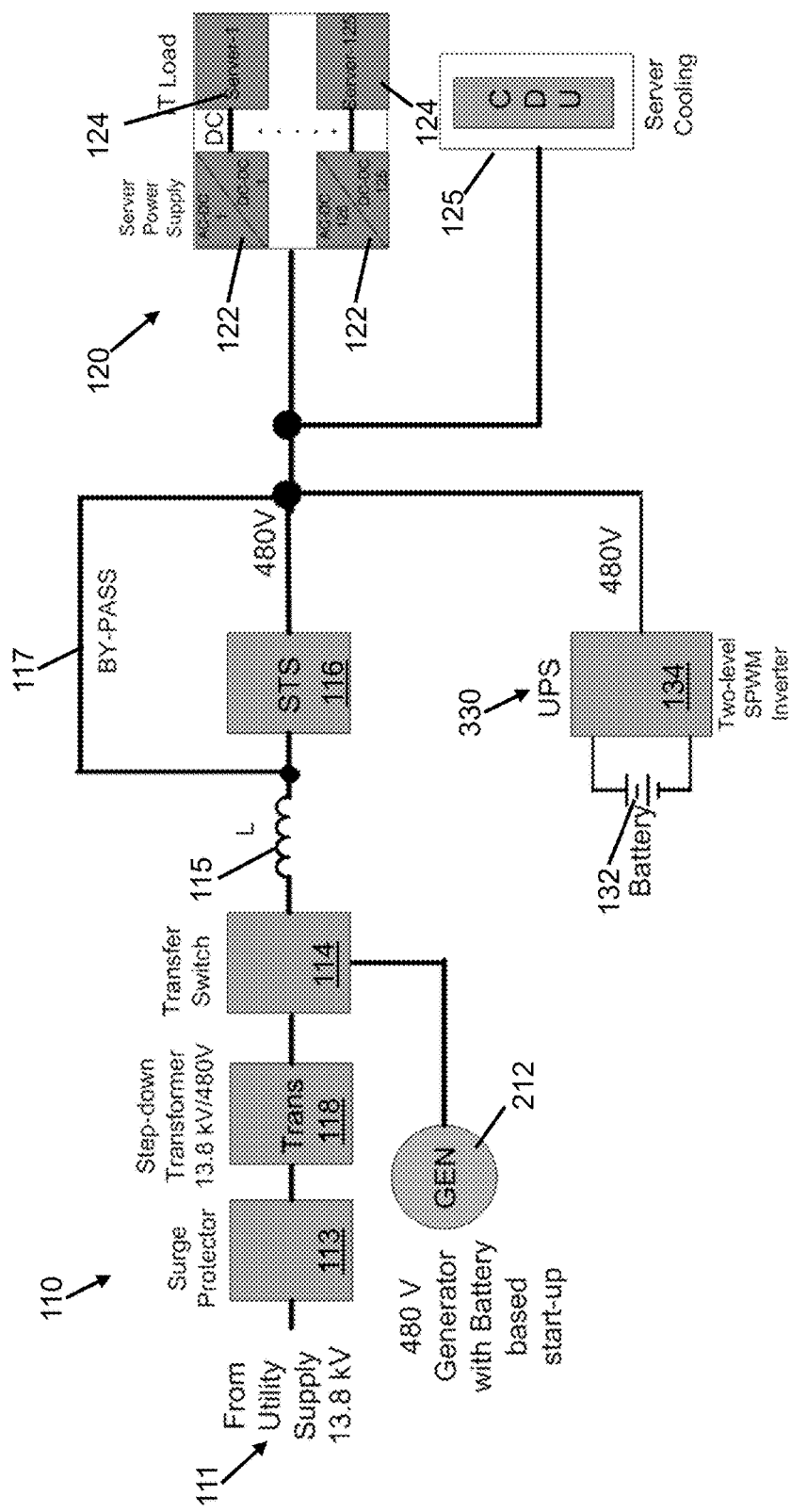
FIG. 4 is a circuit block diagram of an LV data center topology with independent LV generator with battery-based start-up and independent LV UPS with battery-based energy storage.

FIG. 4 is a circuit block diagram of an LV data center system with an independent LV generator 212 with battery-based start-up and the independent LV UPS 330 with a battery-based energy storage device. Both output voltages of the UPS 330 and generator 212 are low voltages, e.g. 480 V. The step-down transformer 118 is placed between the surge protector 113 and the transfer switch 114 to operate both the utility supply system 110 and the UPS 330 at low voltage, e.g. 480 V, distribution.

Figure 5:
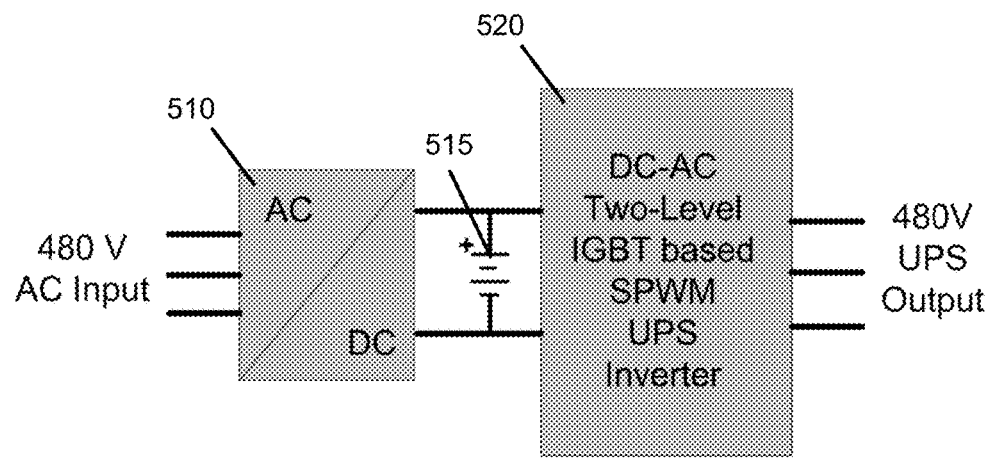
FIG. 5 is a circuit block diagram of an AC-DC-AC two-level SPWM IGBT-based UPS inverter with battery energy storage.

FIG. 5 is a circuit block diagram of the low-voltage two-level inverter 134 of FIG. 2. The two-level inverter 134 includes an AC-DC converter 510, a battery 515 including multiple cells connected in series and/or parallel to provide required voltage and Amp-hour capacity, and a DC-AC two-level sinusoidal pulse width modulation (SPWM) inverter 520, which may include IGBTs. The AC-DC converter 510 converts a 3-phase AC voltage, e.g., 480 VAC, into a DC voltage to charge the battery 515. The battery 515 is charged in regular time. The DC-AC two-level SPWM inverter 520 converts the DC voltage into a 3-phase AC voltage and supplies the load with the AC voltage in case of utility malfunction.

Figure 6:
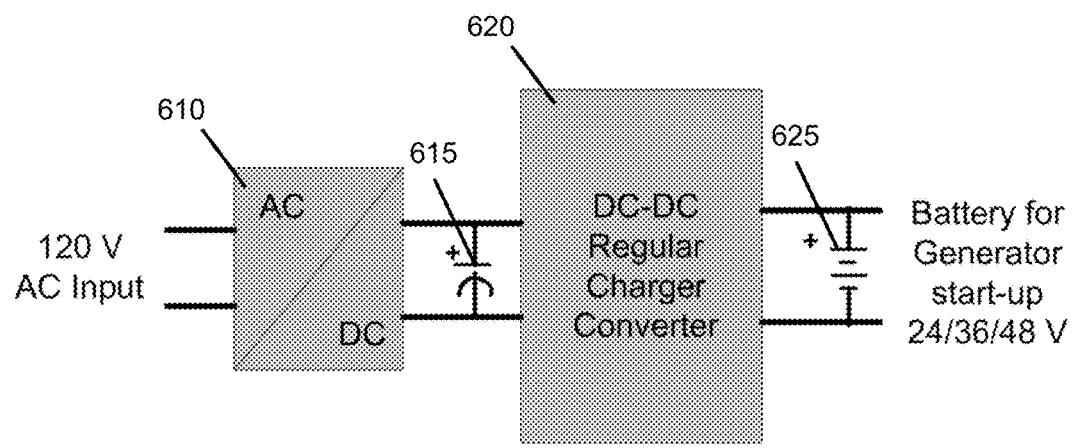
FIG. 6 is a circuit block diagram of an AC-DC-DC regular charger (non-isolated) with battery energy storage for the generator start-up function.

FIG. 6 is a circuit block diagram of an AC-DC-DC regular charger (non-isolated) with a low-voltage battery for starting up the generator 212 of FIG. 2. The AC-DC-DC regular charger includes an AC-DC converter 610, a capacitor 615, a DC-DC regular charger converter 620, and a battery 625 for starting up the generator 112 of FIG. 1 or the generator 212 of FIG. 2. The AC-DC converter 610 converts 1-phase AC voltage into a DC voltage and the DC-DC regular charger converter 620 converts the DC voltage into a battery voltage, e.g., 24 or 36 or 48 V DC, for charging the battery 625.

The data center system of the present disclosure uses a common hybrid energy storage system utilizing at least one ultra-capacitor (UC) module (which may include a single UC cell or multiple UC cells connected in series and/or parallel) and at least one battery module (which may include a single battery cell or multiple battery cells connected in series and/or parallel) for UPS storage and generator start-up. In particular, the data center system of the present disclosure includes a modular dual power source utilizing the common hybrid energy storage system.

UPSs use either lead acid or Li-ion batteries for energy storage. The battery stores energy by using an electrochemical reaction due to its internal chemistry. Therefore, battery charging takes 10 to 60 minutes depending on the type of charger, i.e., depending on whether the charger is a fast charger or a slow charger. On the other hand, capacitors store energy by means of electric static charge, which does not involve the chemical reaction of a battery. Therefore, the charging time of an ultra-capacitor (UC) is very fast, taking approximately 5 to 15 seconds based on kWh capacity of a UC. The UC, which is also referred to as a super capacitor or double-layer capacitor, has very high capacitance in comparison to regular capacitors.

Many conventional generators use lead-acid batteries for start-up. Batteries should have sufficient capacity to provide high cranking current for 1 to 3 seconds during start-up of the generators. Due to the internal chemistry, many batteries have a high equivalent series resistance. Thus, many batteries are not suitable for high cranking current requirements, which may be 5 to 8 times the regular current demand, for starting up a generator. Also, in cold conditions, e.g., around 0° C., the cranking current requirement increases. The overall life cycle of the battery decreases due to this type of operational requirement.

Ultra-capacitors (UCs) are well suited for the above-described types of applications. The cycle life of UCs is very high. They have approximately a 1 million cycle life in comparison to the 500 to 1000 cycle life for lead-acid batteries and 1000 to 3000 cycle life for Li-ion batteries. Also, UCs have the capacity to operate at extremely low temperatures. The charge temperature of a UC is typically −40° C. to 65° C. whereas the charge temperature of a Li-ion battery is 0° C. to 45° C. Similarly, the discharge temperature of a UC is typically −40° C. to 65° C. whereas the discharge temperature of a Li-ion battery is −20° C. to 60° C. Therefore, as compared to batteries, UCs have better low temperature charging and discharging characteristics for generator start-up applications.

Also, the start-up time of a generator is reduced by providing high peak current in less time because the equivalent series resistance (ESR) of a UC is much lower than that of a battery. Furthermore, UCs cannot be overcharged. Thus, UC chargers do not require full-charge detection mechanisms. The current automatically stops when the UC is fully charged. But a UC DC-DC charger may include current limit capability to avoid excessive inrush current when charging a discharged UC. Moreover, as compared to a battery, the depth of discharge (DOD) of a UC can be much deeper, e.g., 70% to 80% without reducing its life cycle. Therefore, the data center system of the present disclosure incorporates UCs to provide start-up current for the generator and to provide transient power to meet the IT power requirements of the data center load via a UPS system.

There are advantages to combining a battery with a UC. For example, the energy density (Wh/kg) of a Li-ion battery is 120 whereas the energy density of a UC is 6. Therefore, the energy density of battery may be almost 20 times higher than the energy density of a UC. On the other hand, the power density (W/kg) of a UC is approximately 10,000 whereas the power density of a Li-ion battery is 250. Therefore, the power density of a UC is almost 40 times higher than the power density of a battery. Therefore, the hybrid energy storage system provides both high power and high energy density in the same package.

Also, a battery is better suited for long duration (>1 minute), medium power events with higher energy requirement. Therefore, a battery is better suited for steady state IT load requirements of a UPS system for longer durations. A UC is better suited for short duration (1-3 seconds), peak power events with lower energy requirement. Therefore, a UC is suitable for generator start-up and transient IT load requirements of a UPS system.

Also, if the operating DOD range is smaller for the battery, i.e., the battery is not used to supply power to a transient IT load, then cycle life of the battery increases drastically. For example, the Li-ion battery has 3000 life cycles at a DOD of 80%. But the life cycles increase to 1 million if the DOD range is around 3%.

Therefore, by combining UCs and batteries, the battery life increases drastically and last longer as the DOD requirement is reduced drastically because the battery supplies only steady state current and the UC takes care of transient load requirements. Therefore, the steady and transient state power load profile demand is optimized by utilizing hybrid energy storage, i.e., both a battery and a UC.

Figure 7:
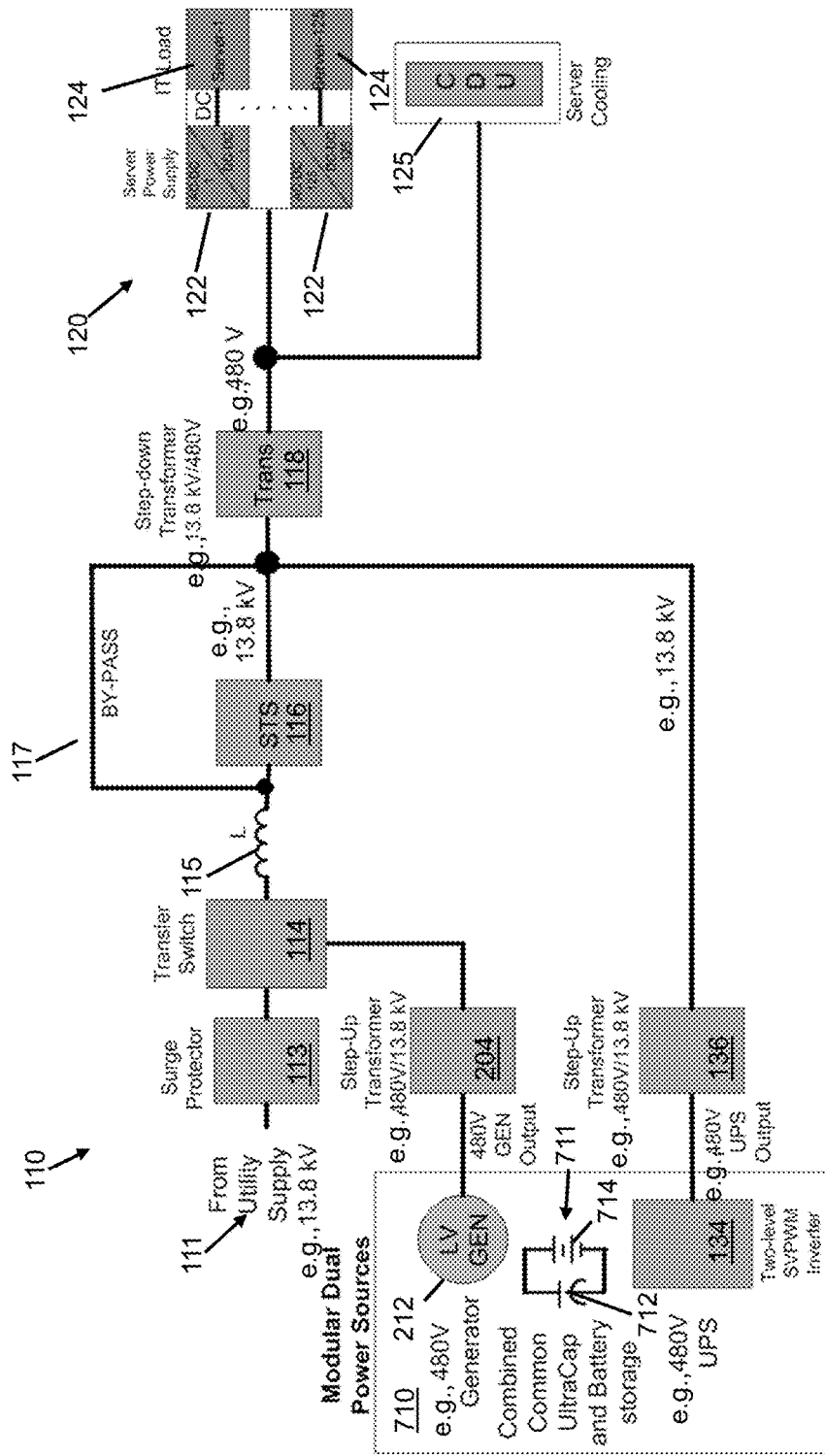
FIG. 7 is a circuit block diagram of an MV data center system with modular dual power sources and incorporating a common hybrid energy storage system including the combination of an ultra-capacitor (UC) module and a battery module.

FIG. 7 is a circuit block diagram of a MV data center system with a modular dual power source that combines at least one ultra-capacitor (UC) module 712 and at least one battery module 714 into a hybrid energy storage system 711. The hybrid energy storage system may incorporate any series and/or parallel combinations of ultra-capacitors and battery cells depending on the voltage and current requirements of the load after an interruption in power from the utility supply 111. The modular dual power source also includes the LV generator 212 and the two-level inverter 134, each of which is coupled to the hybrid energy storage system 711. The output of the LV generator 212 is connected to the step-up transformer 204 and the LV UPS 134 is connected to the step-up transformer 136 to obtain medium voltage outputs for medium voltage applications. In other embodiments, the MV data center system of FIG. 7 may be converted into a LV data center system by removing the step-up transformers 136 and 204 and the step-down transformer 118.

Figure 8A:
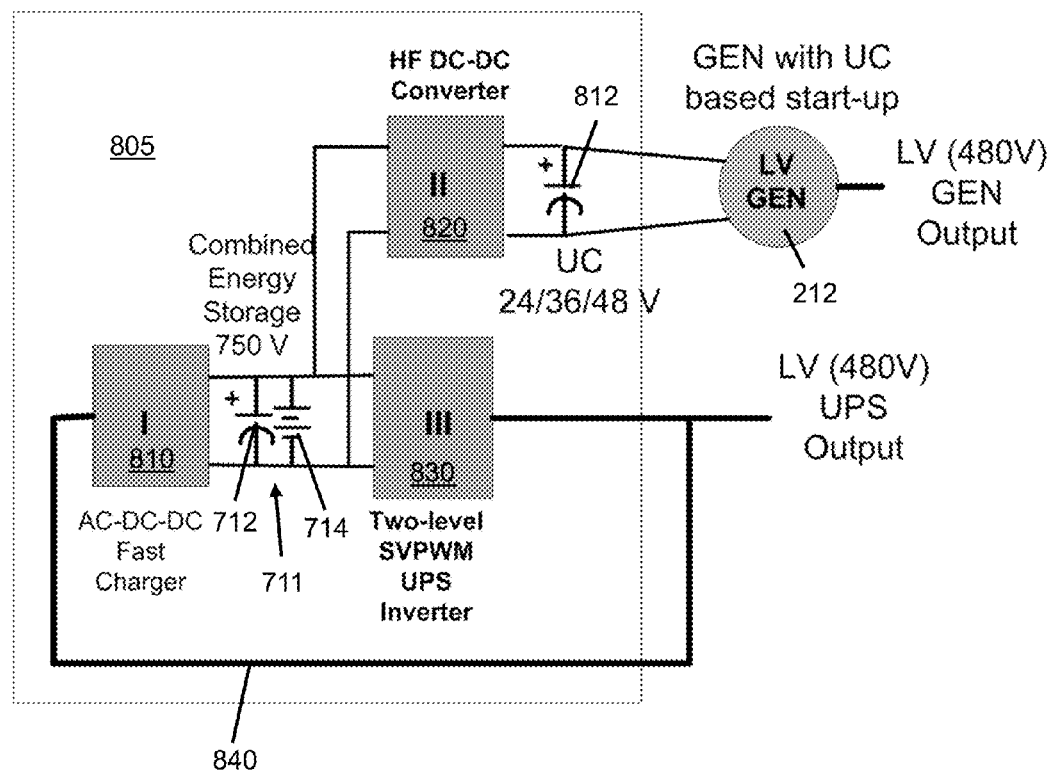
FIGS. 8A and 8B are circuit block diagrams of modular dual power sources including a common hybrid energy storage system including an ultra-capacitor module and a battery module for both UPS and generator start-up utilizing a AC-DC-DC-based fast charger.
Figure 8B:
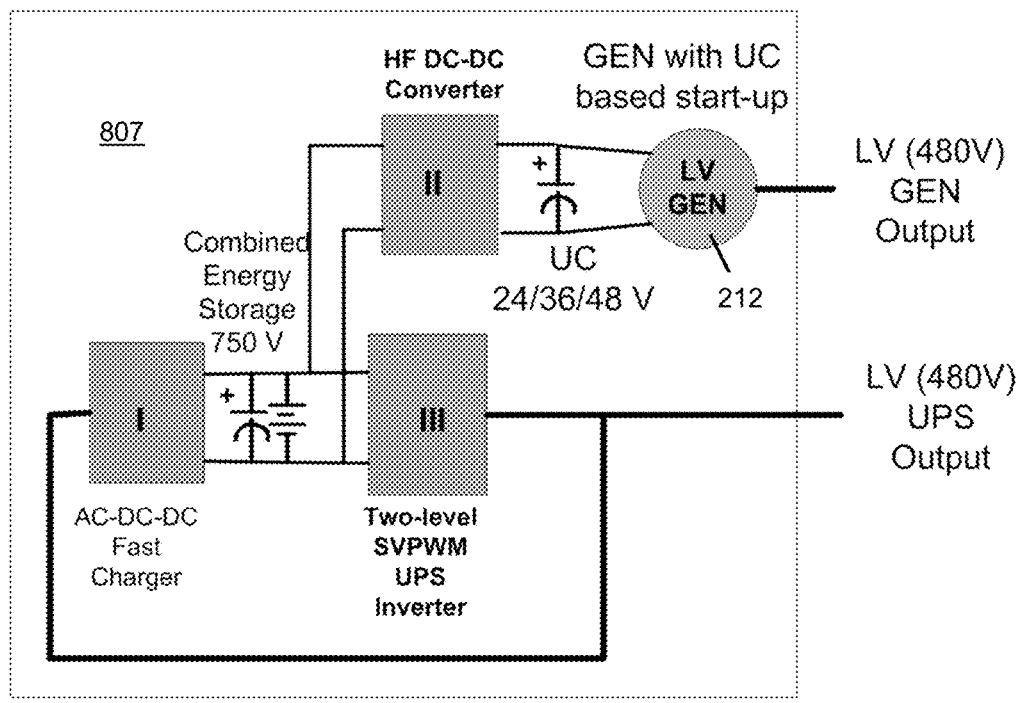

FIGS. 8A and 8B are circuit block diagrams of modular dual power sources according to embodiments of the present disclosure. The modular dual power source 805 of FIG. 8A includes the common hybrid energy storage system 711, in which the battery module 714 is coupled in parallel with the ultra-capacitor module 712. The modular dual power source of FIG. 8A also includes a two-level inverter 830 coupled to the hybrid energy storage system 711, a high frequency DC-DC converter 820 coupled to the hybrid energy storage system 711, an AC-DC-DC fast charger 810 coupled to the hybrid energy storage system 711, and an ultra-capacitor module 812 coupled to the output of the high frequency DC-DC converter 820.

The two-level inverter 830 discharges the hybrid energy storage system 711 if there is an interruption in power from the utility supply 111. The ultra-capacitor module 812 is used for starting up the generator 212. The high frequency DC-DC converter 820 charges the ultra-capacitor module 812 using power from the hybrid energy storage system 711. The high frequency DC-DC converter is compact because of its use of high frequency switching, e.g., switching at 150 kHz. The AC-DC-DC fast charger 810 receives power from the utility supply 111 via the line 840 to charge the common hybrid energy storage system 711. The hybrid energy storage system 711 is "common" because it is common to both the high frequency DC-DC converter 820 and the two-level inverter 830.

In the embodiment of FIG. 8A, the modular dual power source 805 does not include the LV generator 212. FIG. 8B shows an embodiment of a modular dual power source 807 which includes the LV generator 212.

Figure 9A:
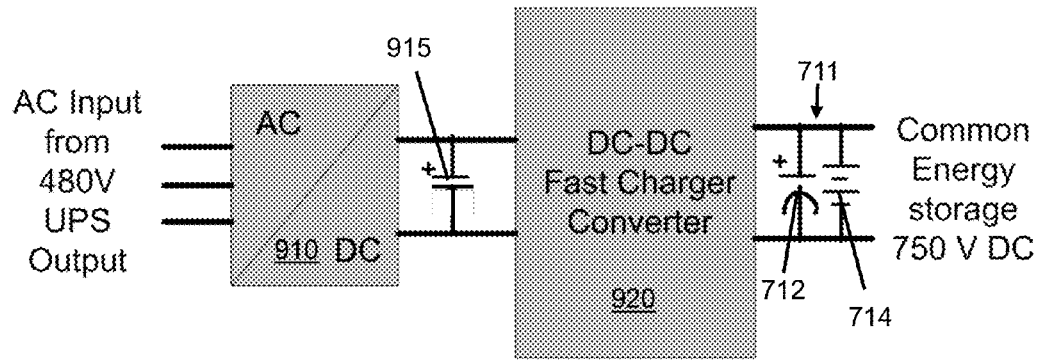
FIGS. 9A and 9B are circuit block diagrams of AC-DC-DC fast chargers for the hybrid energy storage system.
Figure 9B:
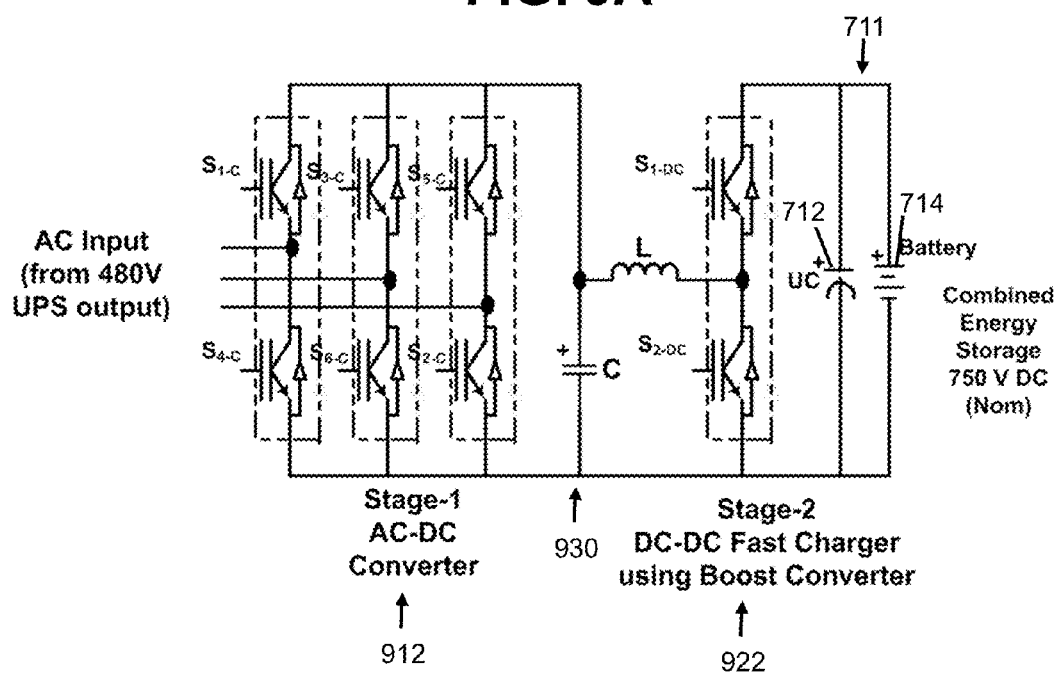

FIGS. 9A and 9B show the fast charger 810 of FIG. 8A for the hybrid energy storage system 711. As shown in FIG. 9A, the fast charger 810 includes an AC-DC converter 910, a capacitor 915 connected to the AC-DC converter 910, and a DC-DC fast charger converter 920 connected to the capacitor 915.

As illustrated in the embodiment of FIG. 9B, the fast charger converter 920 is implemented as a boost converter 922 with IGBTs to charge the hybrid energy storage system 711 in minutes so that it is ready for action in case the utility supply 111 is interrupted or fails. Because the boost converter 922 uses IGBTs, it may be used as a bidirectional fast charger converter. The AC-DC converter 912 includes three pairs of IGBTs connected to each other in parallel. The fast charger of FIG. 9B also includes an LC filter 930 coupled to the AC-DC converter 912 to smooth out DC harmonics and a DC-DC boost converter 922 coupled to the LC filter 930.

Figure 10A:
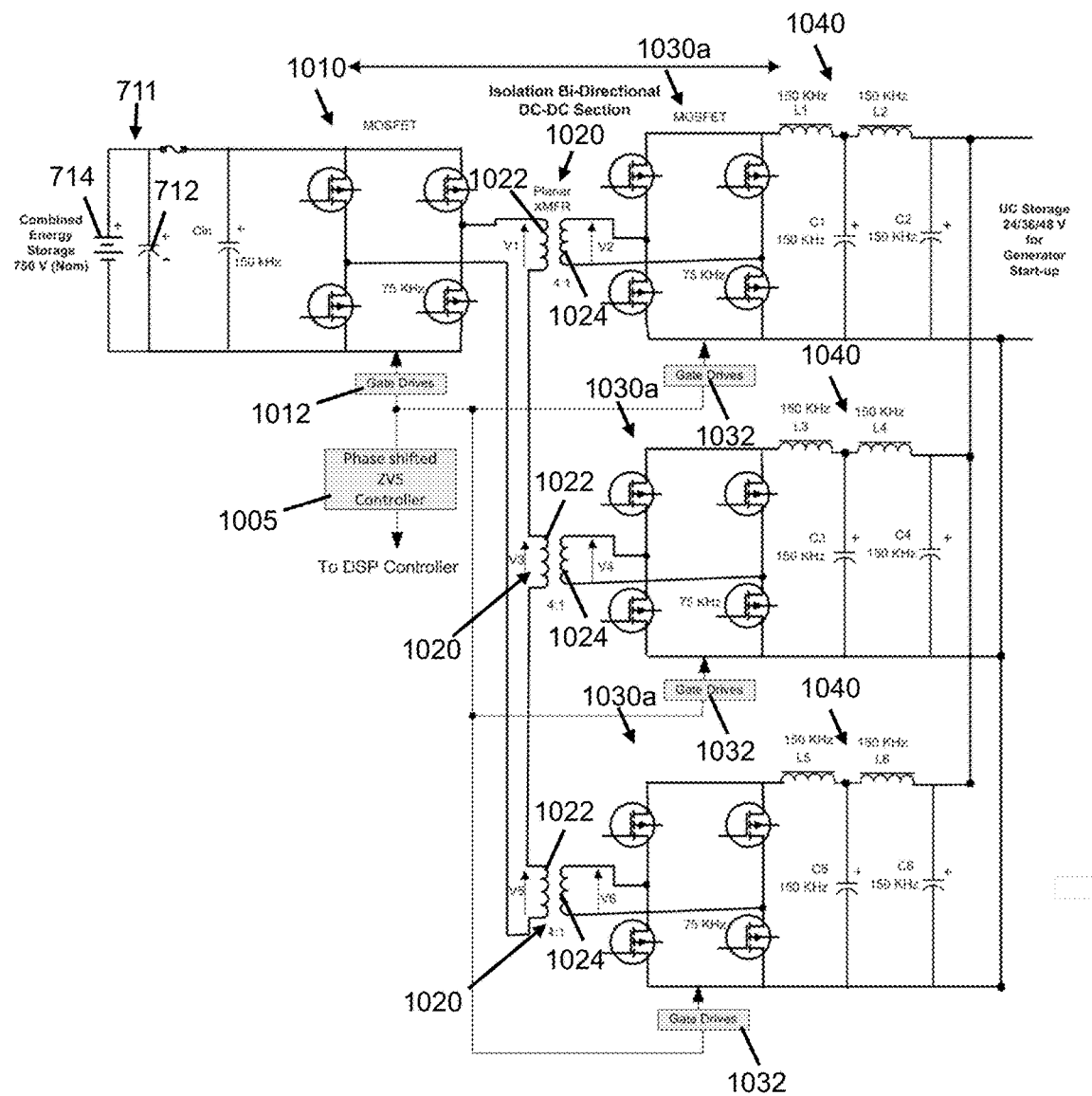
FIGS. 10A and 10B are circuit block diagrams of MOSFET-based isolated high frequency DC-DC converters of FIGS. 8A and 8B using a UC module for generator start-up.
Figure 10B:
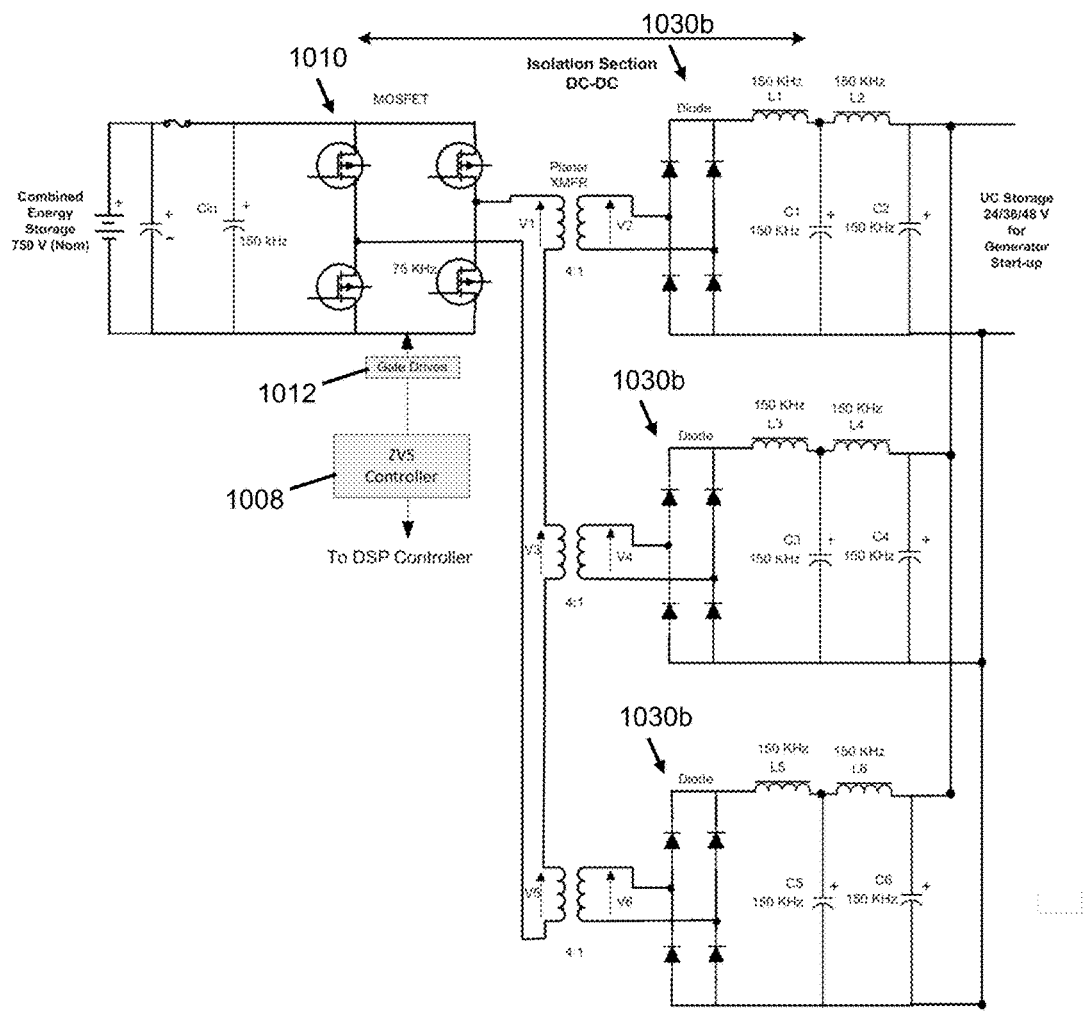

FIGS. 10A and 10B are circuit block diagrams illustrating embodiments of the high frequency DC-DC converter 820 of FIGS. 8A and 8B. A high frequency system is used to reduce the size or volume of the DC-DC converter and can be incorporated as a part of the generator electronics. The high frequency DC-DC converter of FIG. 10A is a bidirectional high frequency DC-DC converter and includes a first H-bridge circuit 1010, a plurality of high frequency planar transformers having primary sides 1022 connected in series and secondary sides 1024 connected in parallel, a plurality of second H-bridge circuits 1030a connected to respective secondary sides 1024 of the plurality of transformers 1020, and dual LC filters 1040 coupled to respective second H-bridge circuits 1030a. The transformers are used to magnetically isolate the UPS and generator functions and to avoid interference between the UPS and the generator.

The primary sides 1022 of the transformers 1020 are connected in series and the secondary sides 1024 of the transformers 1020 are connected in parallel. As shown in FIG. 10A, three transformers 1020, which may be planar transformers, each with a 4:1 turn ratio, are used. The effective turn ratio is 12:1 because the primary side windings are in series and the secondary side windings are in parallel. Thus, in the example of FIG. 10A, the transformers step down the voltage from 750 V on the primary side to 62.5 V (750 V/12) on the secondary side.

As shown in FIG. 10A, the first H-bridge circuit 1010 includes four MOSFET devices connected in an H-bridge configuration and each of the second H-bridge circuits 1030a includes four MOSFET devices connected in an H-bridge configuration. Therefore, it has bidirectional power transfer capability. In this configuration, the generator 212 may be used to perform charging of the hybrid energy storage system 711.

The high frequency DC-DC converter of FIG. 10A also includes gate drives 1012 for driving the MOSFET devices of the first H-bridge circuit 1010 and gate drives 1032 for driving the MOSFET devices of the second H-bridge circuits 1030a. The gate drives 1012 and 1032 are controlled by a phase-shifted zero voltage switching (ZVS) controller 1005, which is in communication with a DSP controller (not shown). The ZVS strategy is used to reduce the switching losses of the MOSFET devices.

The phase-shifted ZVS controller 1005 performs switching only when the voltage is zero. The phase-shifted ZVS controller 1005 also introduces a phase shift between the primary side 1022 of the transformers and the secondary side 1024 of the transformers. The phase-shifted ZVS controller 1005 causes power to flow from the hybrid energy storage system 711 to the ultra-capacitor module 812 for generator start-up by controlling the gate drives 1012 and 1032 to cause the voltage of the primary side 1022 to lead the voltage of the secondary side 1024. The phase-shifted ZVS controller 1005 causes power to flow from the generator 212 to the hybrid energy storage system 711 by controlling the gate drives 1012 and 1032 to cause the voltage of the secondary side 1024 to lead the voltage of the primary side 1022. The phase-shifted ZVS controller 1005 causes no power to flow between the generator 212 and the hybrid energy storage system 711 by controlling the gate drives 1012 and 1032 to cause the phase between the voltage of the secondary side 1024 and the voltage of the primary side 1022 to be zero. The phase-shifted ZVS controller 1005 and the DSP controller may be implemented by hardware, e.g., a microprocessor or digital logic, software, e.g., a computer executing computer program instructions, or a combination of hardware and software.

FIG. 10B illustrates a unidirectional high frequency DC-DC converter in which each of the second H-bridge circuits 1030b includes a plurality diodes connected in an H-bridge configuration. The high frequency DC-DC converter of FIG. 10B includes a ZVS controller 1008 for controlling the gate drives 1012 to drive the MOSFET devices of the first H-bridge circuit 1010. In this configuration, power can only flow from the hybrid energy storage system 711 to the ultra-capacitor module 812 for generator start-up.

Figure 11A:
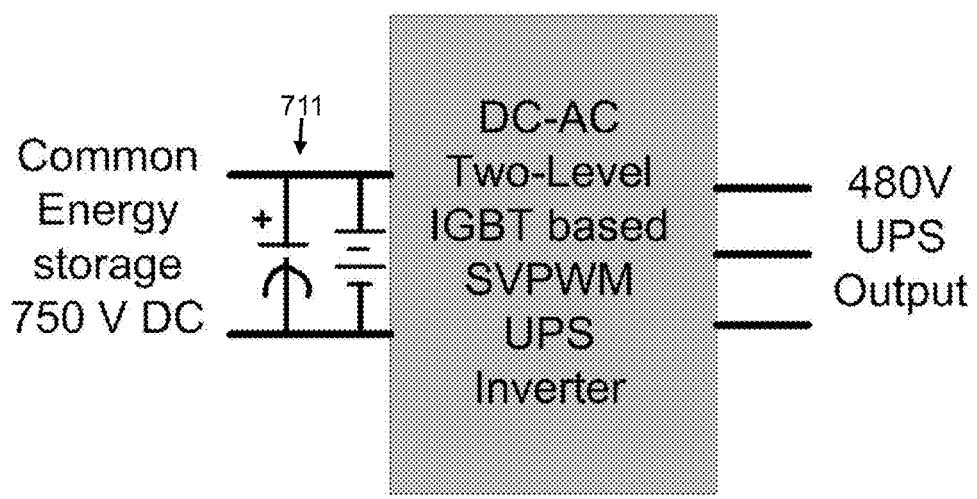
FIG. 11A is a circuit block diagram of a DC-AC two-level SVPWM IGBT-based UPS inverter including the common hybrid energy storage system.
Figure 11B:
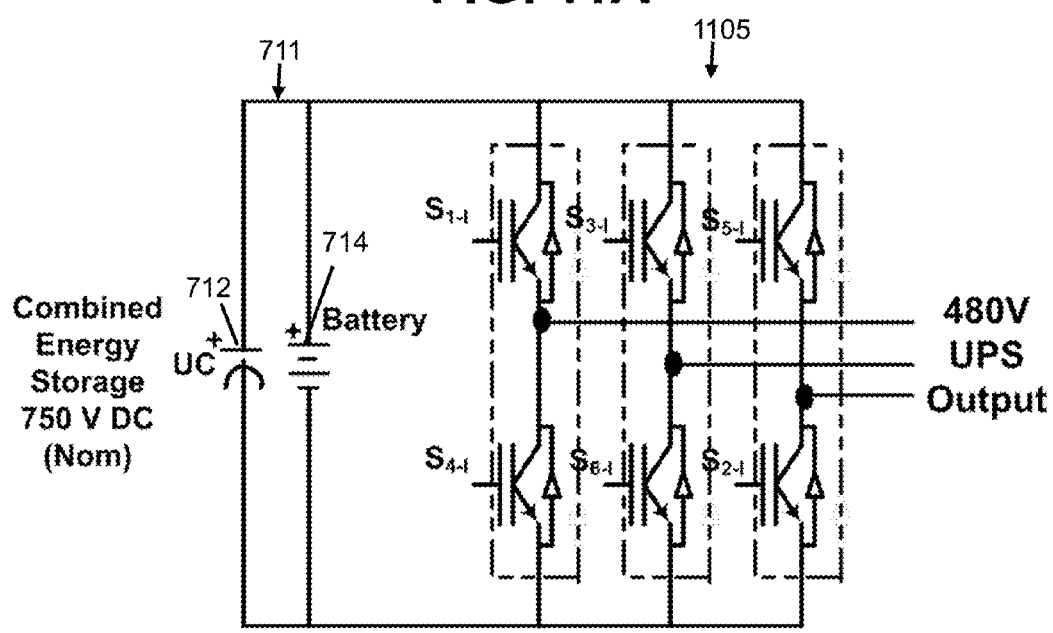
FIG. 11B is a circuit block diagram of a DC-AC two-level SVPWM IGBT-based UPS inverter including the common hybrid energy storage system.

FIGS. 11A and 11B illustrate an embodiment of the two-level inverter 830 of FIGS. 8A and 8B connected to the hybrid energy storage system. The two-level inverter may be a Space Vector Pulse Width Modulation (SVPWM) IGBT-based inverter as illustrated in FIGS. 11A and 11B. SVPWM control is used to enhance the linear operating range of the two-level inverter (e.g., from 78.5% to 90.7%) and to reduce the harmonic levels at its output as compared to sinusoidal PWM-based (SPWM) control. As shown in FIG. 11B, the two-level inverter includes three pairs of series-connected IGBTs, which are coupled together in parallel.

Figure 12:
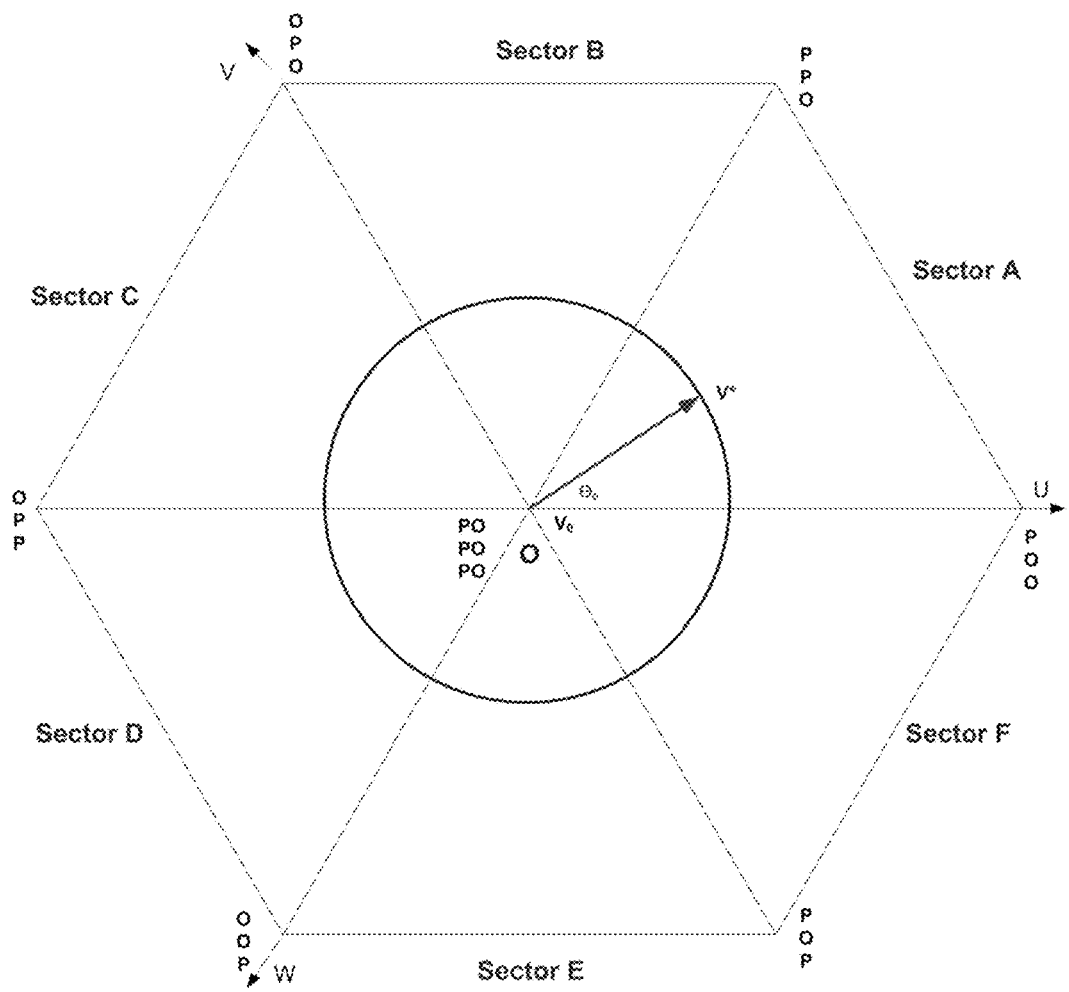
FIG. 12 is a space vector diagram for the two-level inverter of FIGS. 11A and 11B.

FIG. 12 is a space vector diagram that is implemented by an inverter controller of the two-level inverter 830. There are $2^3=8$ switching states: PPP and OOO are zero states and the remaining six states are active states. The hexagon has six sectors: A to F. The zero vector $V_0$ lies in the center of hexagon. The reference voltage vector is $V^*$.

The inverter controller of the present disclosure may include a digital logic circuit, such as a Field Programmable Gate Array (FPGA), and a processor, such as a digital signal processor (DSP) or a microprocessor. The processor samples the reference voltage vector $V^*$ and an angle $\ominus e^*$, and identifies a sector based on the sampled reference voltage vector $V^*$ and angle $\ominus e^*$. The processor then selects pre-defined switching sequences and pre-calculated turn-on time values based on the identified sector and region location of the reference voltage vector $V^*$. The digital logic circuit generates PWM switching signals for driving power transistors of a two-level inverter based on the turn-on time values and the selected switching sequences. More detail relating to implementation of a space vector diagram is contained in International Application No. PCT/US2015/056785, which is incorporated by reference herein.

Figure 13:
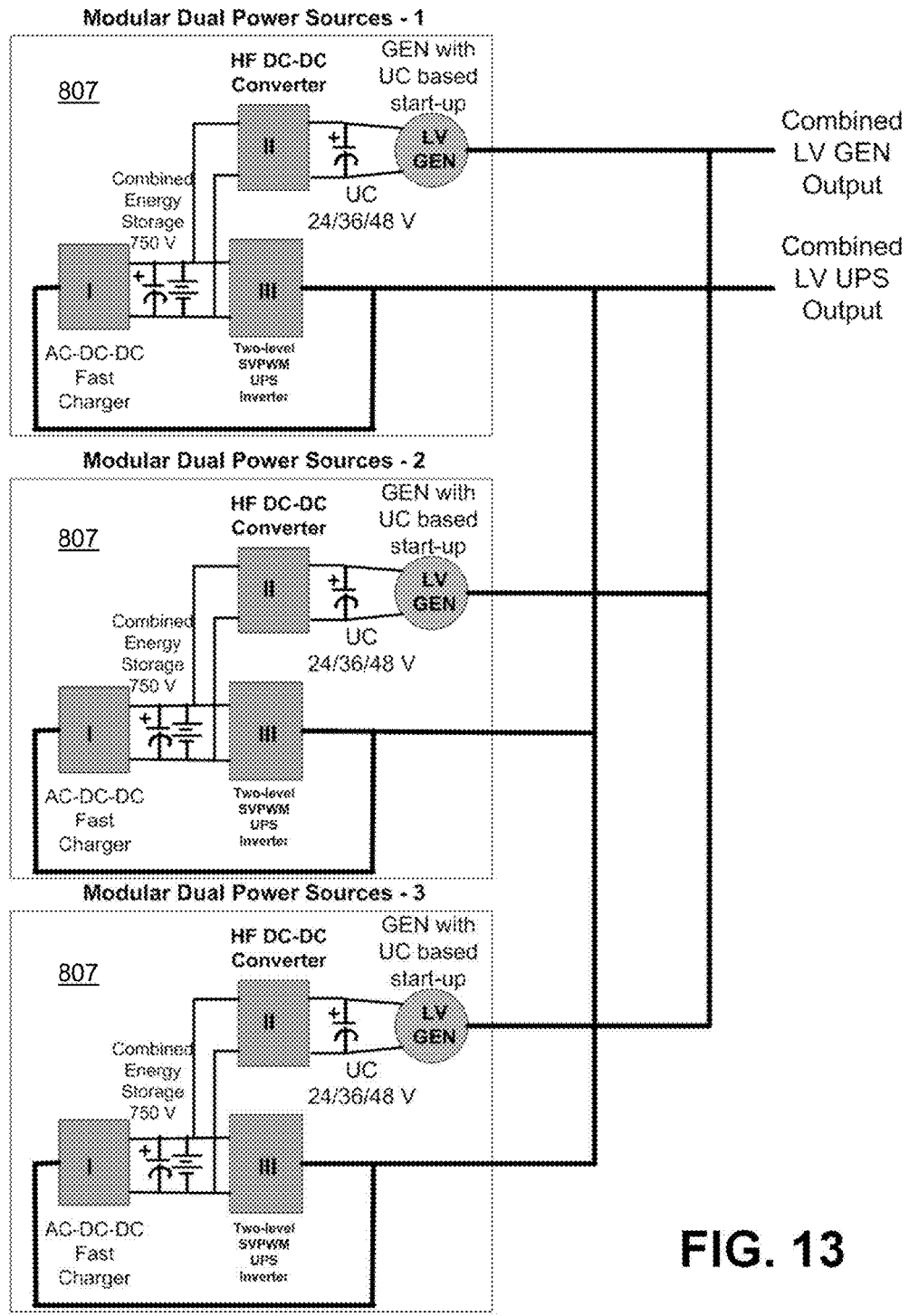
FIG. 13 is a circuit block diagram of multiple power sources connected in parallel to provide large MW output power.

In embodiments, additional modular dual power sources 805 and/or 807 may be connected to modular dual power sources 805 and/or 807 as the backup power requirements increase. For example, FIG. 13 is a circuit block diagram illustrating how three modular dual power sources 807 are connected in parallel to provide large MW output power. Thus, as the data center capacity requirements increase based on future load demand, additional modular dual power sources 805 and/or 807 may be added in the future to reduce initial Capital Expenditure (CAPEX) cost.

Figure 14:
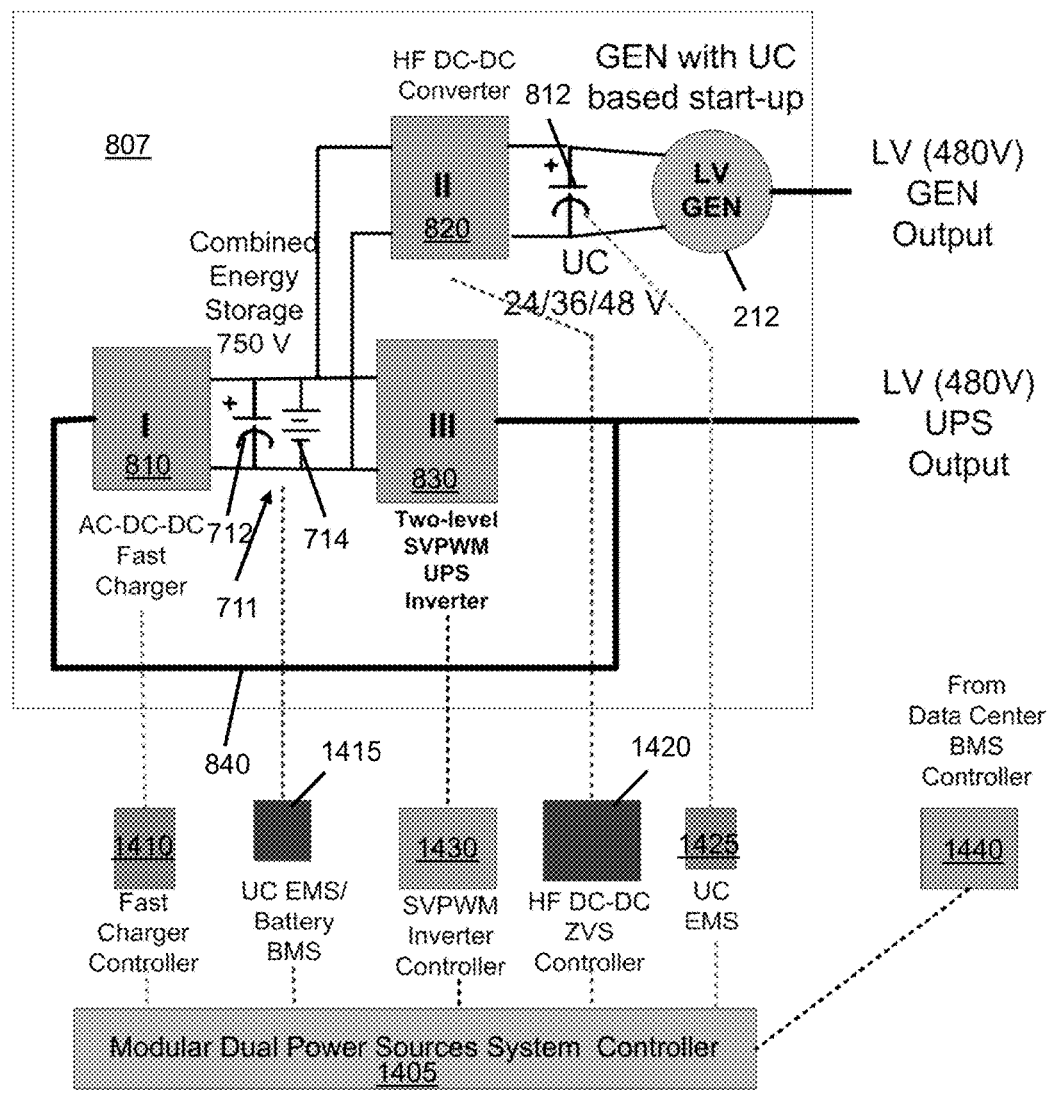
FIG. 14 is a circuit block diagram of a modular dual power source system including a backup power source control system having a controller and sub-system controllers for controlling components of the modular dual power source of FIG. 8B.

FIG. 14 illustrates a backup power source control system for controlling the modular dual power source 807 of FIG. 8B. The backup power source control system includes a system controller 1405 and six main sub-system controllers: (1) a fast charger controller 1410; (2) an SVPWM inverter controller 1430; (3) an isolated high frequency DC-DC ZVS controller 1420; (4) a UC energy management system (EMS) and battery management system (BMS) 1415, which form a hybrid energy management system; (5) a UC EMS 1425; and (6) a data center building management system (BMS) controller 1440.

The UC EMS and BMS 1415 maintain cell balancing and protection of the hybrid energy storage system 711. The UC EMS and BMS 1415 also collect information regarding the status and/or health of the hybrid energy storage system 711, e.g., current, voltage, and/or temperature of the ultra-capacitor cells and battery cells in the hybrid energy storage system 711, and provide this information to the system controller 1405.

The fast charger controller 1410 controls the fast charger 810 to charge the hybrid energy storage system 711 based on the information regarding the hybrid energy storage system 711 obtained by the hybrid energy management system 1415. For example, the system controller 1405 provides commands to the fast charger controller 1410 based on the status and/or health information received from the hybrid energy management system 1415, which cause the fast charger controller 1410 to control the fast charger 810 to charge the hybrid energy storage system 711.

The UC EMS 1425 maintains cell balancing and protection of the UC module 812. The UC EMS 1425 also collects information regarding the status or health of the UC module 812, e.g., cell temperature or cell voltage, and provides this information to the system controller 1405. The high frequency DC-DC converter controller 1420 controls the high frequency DC-DC converter 820 to charge the UC module 812 using energy from the hybrid energy storage system 711 based on the information regarding the UC module 812 obtained by the UC EMS 1425. For example, the system controller 1405 provides commands to the high frequency DC-DC ZVS controller 1420 based on the status or health information, which causes the high frequency DC-DC ZVS controller 1420 to control the high frequency DC-DC converter 820 to charge the UC module 812 using energy from the hybrid energy storage system 711.

The SVPWM inverter controller 1430 controls the two-level inverter 830 to discharge and provide power in case of an interruption in power from the utility supply 111. The BMS controller 1440 interfaces with the building management system (BMS) and acts according to information provided by the BMS. The BMS controller 1440 may be configured to detect whether there is an interruption in or failure of the utility power supply and send a command signal to the inverter controller 1430 to control the two-level inverter 830 to discharge energy from the hybrid energy storage system 711 if the BMS controller 1440 detects an interruption in power from the utility supply 111 or failure of the utility supply 111.

While several embodiments of the disclosure have been shown in the drawings and/or described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A power source comprising:
   a first ultra-capacitor module;
   a battery module coupled in parallel with the first ultra-capacitor module;
   a two-level inverter coupled to the first ultra-capacitor module and the battery module;
   a high frequency DC-DC converter coupled to the first ultra-capacitor module and the battery module;
   a fast charger coupled to the first ultra-capacitor module and the battery module, and operable to charge the first ultra-capacitor module and the battery module; and
   a second ultra-capacitor module coupled to an output of the high frequency DC-DC converter and configured for starting up a generator.

2. The power source of claim 1, further comprising a low-voltage generator connected to the second ultra-capacitor module.

3. The power source of claim 1, wherein the fast charger is an AC-DC-DC fast charger and is coupled in parallel with the first ultra-capacitor module and the battery module.

4. The power source of claim 3, wherein the AC-DC-DC fast charger includes an AC-DC converter, a capacitor module coupled to the AC-DC converter, and a DC-DC fast charger converter coupled to the capacitor module.

5. The power source of claim 4, wherein the AC-DC converter includes three pairs of series-connected power switching devices for providing 3-phase output power.

6. The power source of claim 5, wherein the power switching devices are insulated-gate bipolar transistors (IGBTs), gate turn-off thyristors (GTOs), or metal-oxide-semiconductor field-effect transistors (MOSFETs).

7. The power source of claim 4, further comprising an LC filter coupled to the AC-DC converter to smooth out harmonics to provide stable DC power.

8. The power source of claim 4, wherein the DC-DC fast charger converter is a DC-DC boost converter.

9. The power source of claim 1, wherein the fast charger is a bidirectional fast charger.

10. The power source of claim 1, wherein the high frequency DC-DC converter includes:
    a first H-bridge circuit;
    a plurality of transformers having primary sides and secondary sides, the primary sides coupled in series to the first H-bridge circuit;
    a plurality of second H-bridge circuits coupled to respective secondary sides of the plurality of transformers; and
    a plurality of LC filters coupled to respective second H-bridge circuits of the plurality of second H-bridge circuits.

11. The power source of claim 10, wherein the first H-bridge circuit includes a plurality of MOSFET devices connected in an H-bridge configuration and each of the second H-bridge circuits includes a plurality of MOSFET devices connected in an H-bridge configuration.

12. The power source of claim 10, wherein the first H-bridge circuit includes a plurality of MOSFET devices connected in an H-bridge configuration and each of the second H-bridge circuits includes a plurality of diodes connected in an H-bridge configuration.

13. The power source of claim 10, wherein the plurality of transformers are high frequency planar transformers.

14. A backup power system comprising:
    a hybrid energy storage system;
    an uninterruptible power supply including an inverter and coupled to the hybrid energy storage system;
    a high frequency DC-DC converter coupled to the hybrid energy storage system;
    an ultra-capacitor module coupled to the high frequency DC-DC converter;
    a low-voltage generator coupled to the ultra-capacitor module;
    a two-level inverter coupled to the hybrid energy storage system; and
    a fast charger coupled to the hybrid energy storage system and configured to charge the hybrid energy storage system.

15. The backup power system of claim 14, wherein the hybrid energy storage system includes a second ultra-capacitor module and a battery module coupled together.

16. The backup power system of claim 14, further comprising:
    a step-up transformer coupled to an output of the low-voltage generator and to an output of the uninterruptible power supply.

17. The backup power system of claim 14, wherein the backup power system does not include a step-up transformer between either an output of the low-voltage generator or an output of the uninterruptible power supply and a load.

18. A backup power source control system comprising:
- a hybrid energy management system that obtains information regarding a hybrid energy storage system including a first ultra-capacitor module and a battery module;
- a fast charger controller that controls a fast charger to charge the hybrid energy storage system based on the information regarding the hybrid energy storage system obtained by the hybrid energy management system;
- an inverter controller that controls an inverter to discharge energy from the hybrid energy storage system if an interruption in or failure of a utility power supply is detected;
- an ultra-capacitor energy management system that obtains information regarding a second ultra-capacitor module for starting up a generator; and
- a high frequency DC-DC converter controller that controls a high frequency DC-DC converter to charge the second ultra-capacitor module using energy from the hybrid energy storage system based on the information regarding the second ultra-capacitor module obtained by the ultra-capacitor energy management system.

19. The backup power source control system of claim 18, further comprising a building management system controller configured to detect whether there is an interruption in or failure of the utility power supply and send a command signal to the inverter controller to control the inverter to discharge energy from the hybrid energy storage system if the building management system controller detects an interruption in or failure of the utility power supply.

20. The backup power source control system of claim 18, wherein the information regarding the hybrid energy storage system or the information regarding the second ultra-capacitor module includes current, voltage, and temperature.

* * * * *